H. CARLILE.
Safety-Locks for Elevators.
No. 158,244.  Patented Dec. 29, 1874.
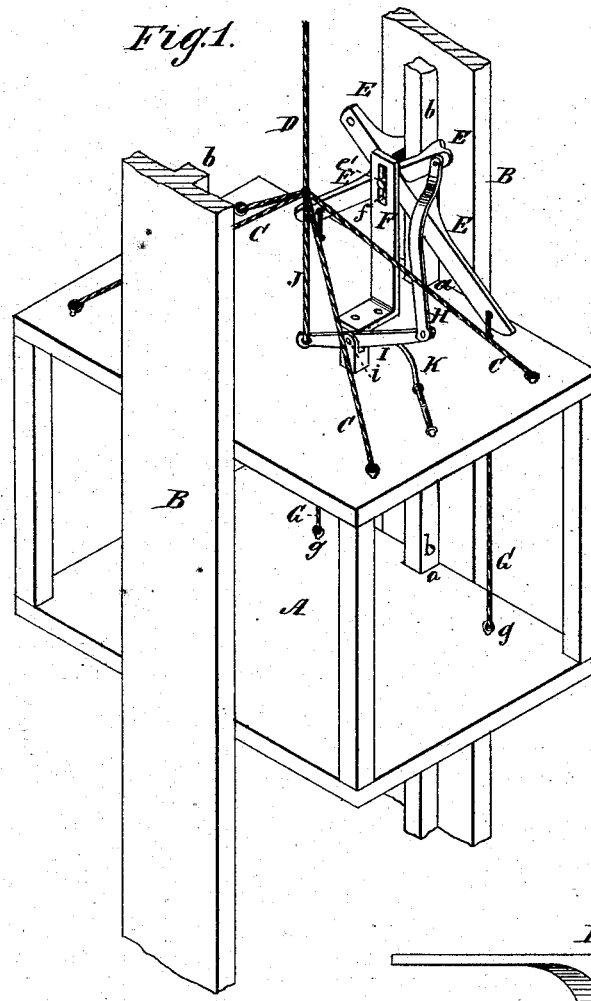
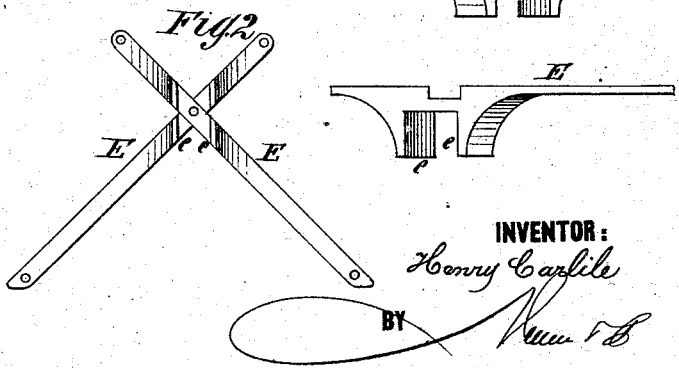
WITNESSES:
INVENTOR: Henry Carlile
BY
ATTORNEYS.

UNITED STATES PATENT OFFICE.

HENRY CARLILE, OF STEUBENVILLE, OHIO.

IMPROVEMENT IN SAFETY-LOCKS FOR ELEVATORS.

Specification forming part of Letters Patent No. 158,244, dated December 29, 1874; application filed November 12, 1874.

*To all whom it may concern:*

Be it known that I, HENRY CARLILE, of Steubenville, in the county of Jefferson and State of Ohio, have invented a new and Improved Safety-Lock for Elevators; and I do hereby declare that the following is a full, clear, and exact description of the same, reference being had to the accompanying drawing forming a part of this specification, in which—

Figure 1 is a perspective, and Fig. 2 a series of detail views in elevation.

The invention contemplates the employment of novel means, in a miner's cage or other elevator, for the purpose of preventing the sudden fall of the same on a break of the rope or other hoisting apparatus.

These means will first be fully described, in connection with all that is necessary to a full understanding thereof, and then pointed out in the claims.

A represents the cage or sliding platform, in which men, merchandise, or material may be raised and lowered. It is provided with grooves $a$ $a$, which embrace the guides $b$ $b$ of the frame B. The cage is attached, by cords C C C C, to a central lifting-rope, D, that may pass through the top of frame.

Instead of the usual clamps for locking the cage or platform to the guides $b$ $b$ when the rope breaks, I use the peculiarly-constructed bevel-clamps E E, each of which has parallel bearing-surfaces $e$ $e$, which are placed obliquely to the levers, one within the other, and pivoted crosswise together. Each lever thus bites on both sides of the guides.

A spring, F, whose slot $f$ works over the pivot $e'$, extends out from the guide $b$, and serves to hold the levers loosely to the guides $b$ $b$, while the distance between the opposite working faces of each lever is sufficiently great to allow them play on the pivot $e'$, so that, when turned in one direction, they will slide smoothly and unobstructedly on the guides, but, when turned in the other, will seize them with a vise-like grasp, and at once prevent a downward movement of the cage or platform.

These levers may be connected in various ways with the platform, so that its weight will cause them to bite upon the guides.

I esteem the best means for opening and clamping the levers to consist in the following devices: I attach the end of each long arm to the platform at $g$ by a cord, G, so long that, when taut, the clamps will bite upon the guides $b$, and when slacked they will be out of frictional contact with them. The end of the short arm of one lever is connected by a rigid strap, H, with the end of the long arm of the lever I, which is itself pivoted at $i$, and has the end of its short arm connected by a cord, J, with the lift-rope. I also place under the end of the long arm of lever I a spring, K, of merely sufficient tension, when unresisted, to throw the working faces of the clamps E E instantaneously into contact with the guides $b$ $b$. As soon as the lift-rope breaks the spring K performs its function, and then the weight of the platform and its contents acts through the cords G G to hold the clamps firmly and immovably against the guides. As the lift-rope rises the short end of lever I rises, the long end is borne down, and, by means of the connection H, the clamps are ungriped and enabled to slide with the platform.

I am aware that automatic clamps to bite upon the sides of guide and arrest the elevator when a rope or lifting device breaks is not, broadly, new.

What I claim is—

1. The combination, with guides $b$ $b$, of two crossed and pivoted clamp-levers, E E, having the parallel working-faces $e$ $e$, operated in the manner and for the purpose specified.

2. The combination, with lift-rope, of the lever I, connected therewith at its short end, and with the short arm of clamp-lever at its long end, thus enabling the clamps to be ungriped, in the manner set forth.

3. The combination, with arm of lever I, having a subjacent spring, and connected by a rigid strap with the short arm of lever-clamp E, of the cage or platform having cords G G, attaching it to the long arms of levers E E, thus enabling the latter to be clamped upon the guide, in the manner specified.

The above specification of my invention signed by me this 5th day of November, A. D. 1874.

HENRY CARLILE.

Witnesses:
SOLON C. KEMON,
CHAS. A. PETTIT.